US010082193B2

(12) United States Patent
Qi et al.

(10) Patent No.: US 10,082,193 B2
(45) Date of Patent: Sep. 25, 2018

(54) ACTUATOR

(71) Applicant: Johnson Electric S.A., Murten (CH)

(72) Inventors: Fa Yun Qi, Shenzhen (CN); Xiang Guo Shi, Shenzhen (CN); Rui Feng Qin, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 413 days.

(21) Appl. No.: 14/859,988

(22) Filed: Sep. 21, 2015

(65) Prior Publication Data

US 2016/0084347 A1 Mar. 24, 2016

(30) Foreign Application Priority Data

Sep. 19, 2014 (CN) .......................... 2014 1 0484623

(51) Int. Cl.
| | |
|---|---|
| *F16H 1/16* | (2006.01) |
| *F16H 57/039* | (2012.01) |
| *F16H 57/028* | (2012.01) |
| *H02K 5/22* | (2006.01) |
| *H02K 5/24* | (2006.01) |
| *H02K 11/38* | (2016.01) |
| *F16H 57/02* | (2012.01) |

(52) U.S. Cl.
CPC ............. *F16H 1/16* (2013.01); *F16H 57/028* (2013.01); *F16H 57/039* (2013.01); *H02K 5/225* (2013.01); *H02K 5/24* (2013.01); *H02K 11/38* (2016.01); *F16H 2057/02026* (2013.01); *F16H 2057/02073* (2013.01)

(58) Field of Classification Search
CPC ........ F16H 1/16; F16H 57/028; F16H 57/089; H02K 11/38; H02K 5/225
See application file for complete search history.

(56) References Cited

U.S. PATENT DOCUMENTS

| | | | | |
|---|---|---|---|---|
| 3,215,973 | A * | 11/1965 | Falconer | H01R 9/2408 439/629 |
| 6,191,512 | B1 * | 2/2001 | Lekeux | H02K 5/225 310/43 |
| 6,317,332 | B1 * | 11/2001 | Weber | B60R 16/0239 310/71 |
| 7,262,530 | B2 * | 8/2007 | Becker | H02K 5/148 310/71 |
| 7,602,090 | B2 | 10/2009 | Huck et al. | |

(Continued)

FOREIGN PATENT DOCUMENTS

DE  10331238 A1  2/2005

*Primary Examiner* — David M Fenstermacher
(74) *Attorney, Agent, or Firm* — Muncy, Geissler, Olds & Lowe, P.C.

(57) ABSTRACT

An actuator includes a motor driving a worm, a gearbox, and a motor control module. The gearbox includes a gearbox housing, a worm wheel mounted in the gearbox and meshed with the worm, and an output mechanism coaxially fixed to the worm wheel. The motor control module includes a control module housing, a printed circuit board received in the control module housing, and a connector connected to the printed circuit board and mounted at an open end of the control module housing, the control module housing connected with the gearbox housing. The control module housing comprises at least one plane surface with at least one resilient vibration absorber mounted thereon.

10 Claims, 9 Drawing Sheets

(56) References Cited

U.S. PATENT DOCUMENTS

| | | | | |
|---|---|---|---|---|
| 8,569,917 | B2* | 10/2013 | Tang | H02K 5/148 |
| | | | | 310/68 B |
| 8,853,902 | B2* | 10/2014 | Gottschalk | H02K 11/026 |
| | | | | 310/68 R |
| 2003/0127921 | A1* | 7/2003 | Akutsu | B62D 5/0406 |
| | | | | 310/68 R |
| 2004/0012279 | A1* | 1/2004 | Ursel | G01D 5/145 |
| | | | | 310/75 R |
| 2004/0061391 | A1* | 4/2004 | Matsuyama | G01P 1/026 |
| | | | | 310/71 |
| 2004/0178687 | A1* | 9/2004 | Mirescu | H02K 23/66 |
| | | | | 310/75 R |
| 2005/0040715 | A1* | 2/2005 | Nesic | H02K 11/38 |
| | | | | 310/71 |

* cited by examiner

ACTUATOR

CROSS REFERENCE TO RELATED APPLICATIONS

This non-provisional patent application claims priority under 35 U.S.C. § 119(a) from Patent Application No. 201410484623.0 filed in The People's Republic of China on Sep. 19, 2014, the entire contents of which are hereby incorporated by reference.

FIELD OF THE INVENTION

This invention relates to driving apparatus in the form of an actuator and, in particular, to an actuator including a motor and a gearbox.

BACKGROUND OF THE INVENTION

Existing actuators typically include a motor as a power source, a gearbox for speed reduction, and a control module for controlling the motor. The motor provides the output via a worm. A worm wheel is disposed in the gearbox, for meshing with the worm. Vibration occurs during operation of the motor, which generates noise. In addition, during operation of the actuator, the interacting force between the meshed worm and worm wheel also leads to vibration, which results in noise of the entire actuator.

SUMMARY OF THE INVENTION

Hence, there is a desire for an actuator which produced less noise.

Accordingly, in one aspect thereof, the present invention provides an actuator comprising: a motor for driving a worm; a gearbox comprising a gearbox housing, a gear train driven by the motor, and an output mechanism driven by the gear train; and a motor control module comprising a control module housing, a printed circuit board received in the control module housing, and a connector connected to the printed circuit board and mounted at an open end of the control module housing, the control module housing connected with the gearbox housing; wherein the control module housing comprises at least one plane surface with a resilient vibration absorber mounted thereon, and the resilient vibration absorber protrudes above the plane surface.

Preferably, the control module housing comprises a lower housing and an upper housing, the lower housing comprises a bottom plate and two side plates respectively connected to two opposite edges of the bottom plate, the bottom plate is substantially parallel to the printed circuit board, the at least one plane surface comprises a surface of the bottom plate facing the printed circuit board, the resilient vibration absorber mounted on the surface of the bottom plate facing the printed circuit board is a first resilient vibration absorber.

Preferably, the first resilient vibration absorber is compressed between the connector and the bottom plate.

Preferably, the connector comprises a rectangular outer housing, and the first resilient vibration absorber is plate-shaped and compressed between the bottom plate and the rectangular outer housing.

Preferably, the control module housing comprises a lower housing and an upper housing, the upper housing comprises a cover plate, the at least one plane surface comprises a surface of the cover plate facing the printed circuit board, and the resilient vibration absorber mounted on the surface of the cover plate facing the printed circuit board is a second resilient vibration absorber.

Preferably, the second resilient vibration absorber is located between the connector and the cover plate.

Preferably, the surface of the cover plate facing the printed circuit board is further provided with a third resilient vibration absorber, and the third resilient vibration absorber is disposed between the cover plate and the printed circuit board.

Preferably, the gear train comprises: a worm driven by the motor, a worm wheel mounted in the gearbox and meshed with the worm, and the output mechanism is coaxially fixed to and rotatable with the worm wheel.

Preferably, at least a portion of the control module housing is integrally formed with at least a portion of the gearbox housing.

Preferably, the gearbox housing defines a worm chamber receiving the worm and a worm wheel chamber receiving the worm wheel, the control module housing defines a control module chamber receiving the printed circuit board, and the control module chamber and the worm chamber are located at opposite sides of the worm.

Preferably, the resilient vibration absorber is a rubber member.

In view of the foregoing, the plane surface of the control module housing is provided with a resilient vibration absorber. The resilient vibration absorber protrudes above the plane surface. Therefore, the resilient vibration absorber can be compressed by another component, such as the printed circuit board or connector, so as to absorb vibration and hence reduce the noise.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
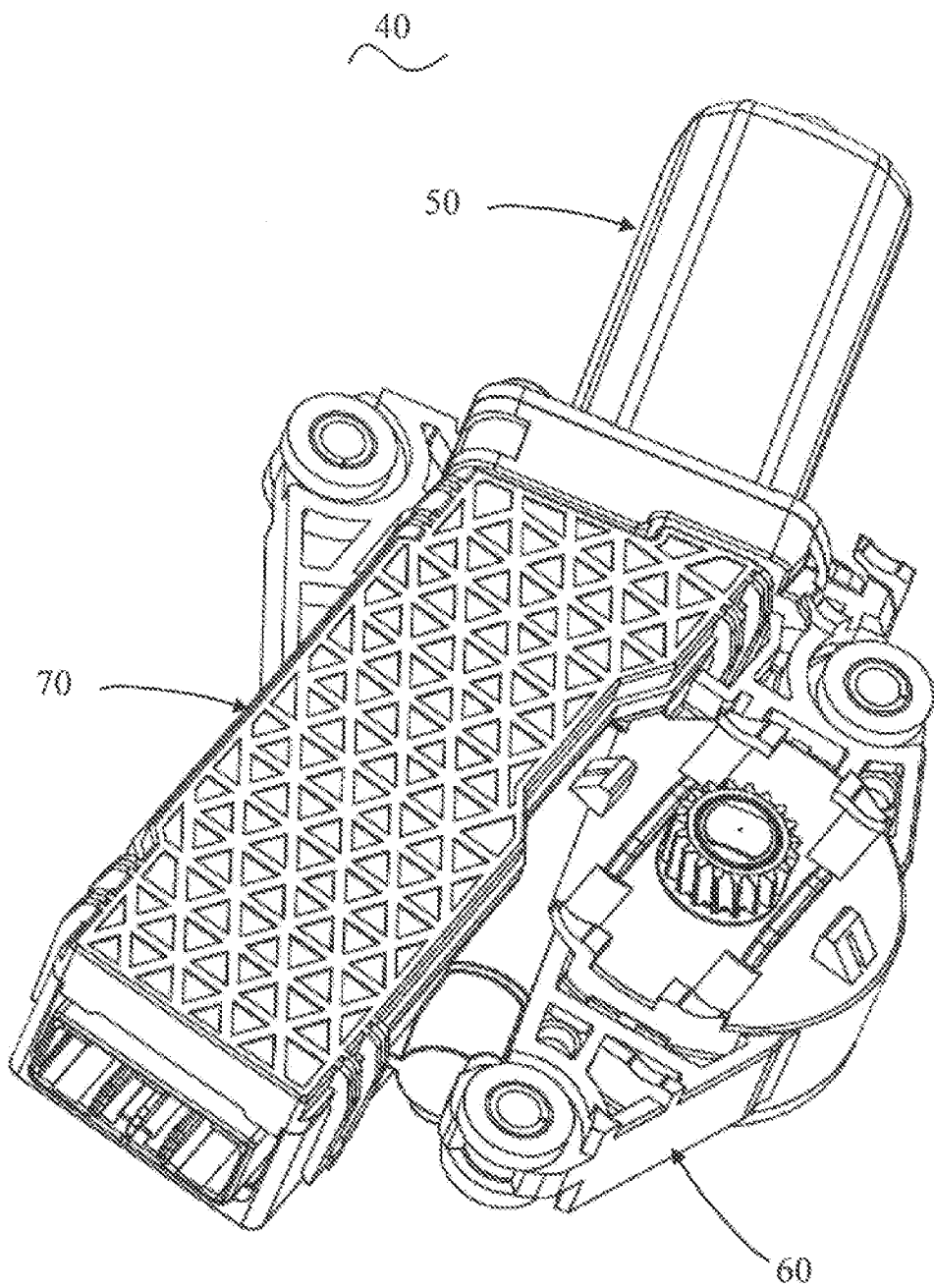
FIG. 1 illustrates an actuator according to one embodiment of the present invention.
Figure 2:
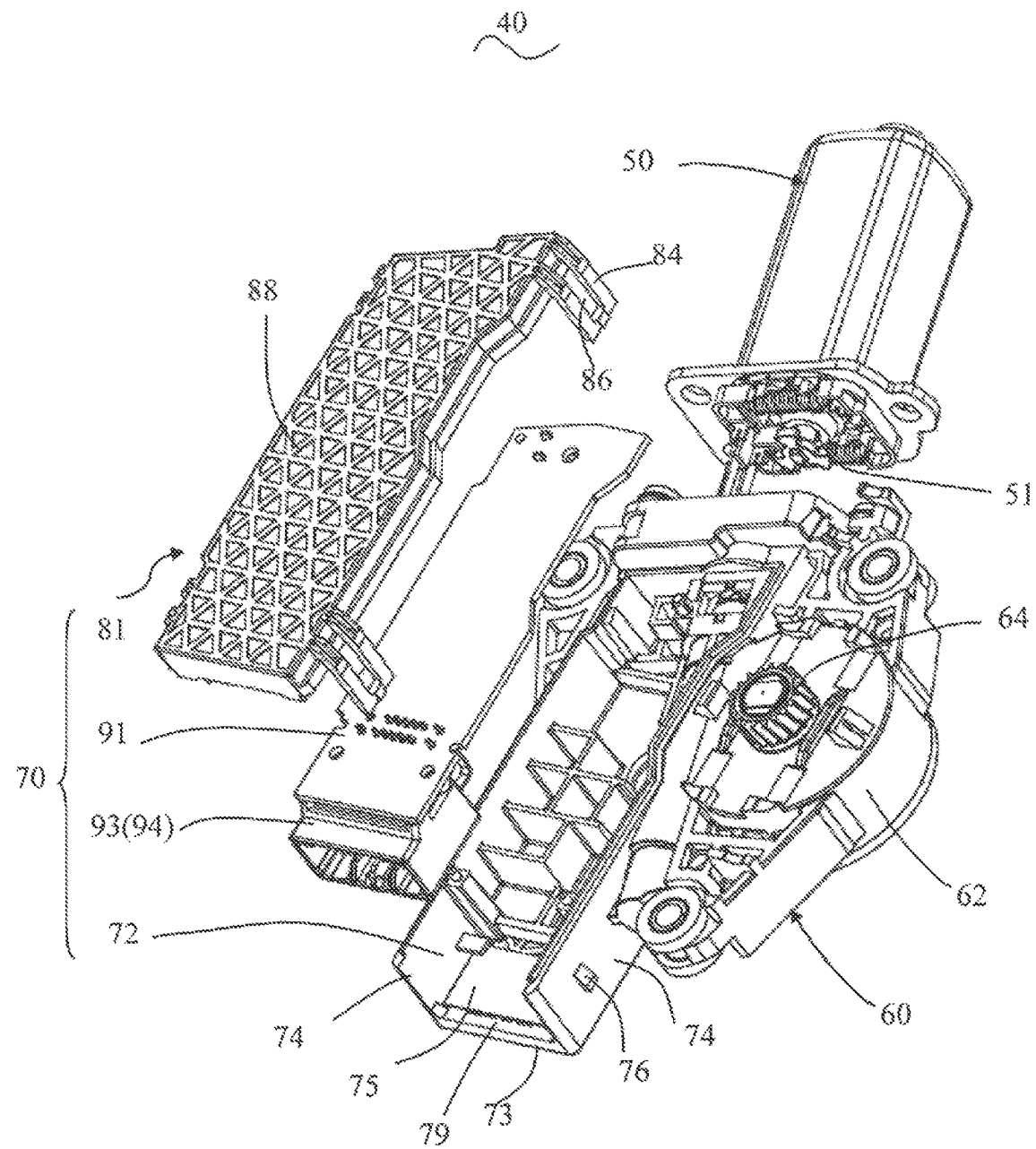
FIG. 2 is an exploded view of the actuator of FIG. 1.
Figure 3:
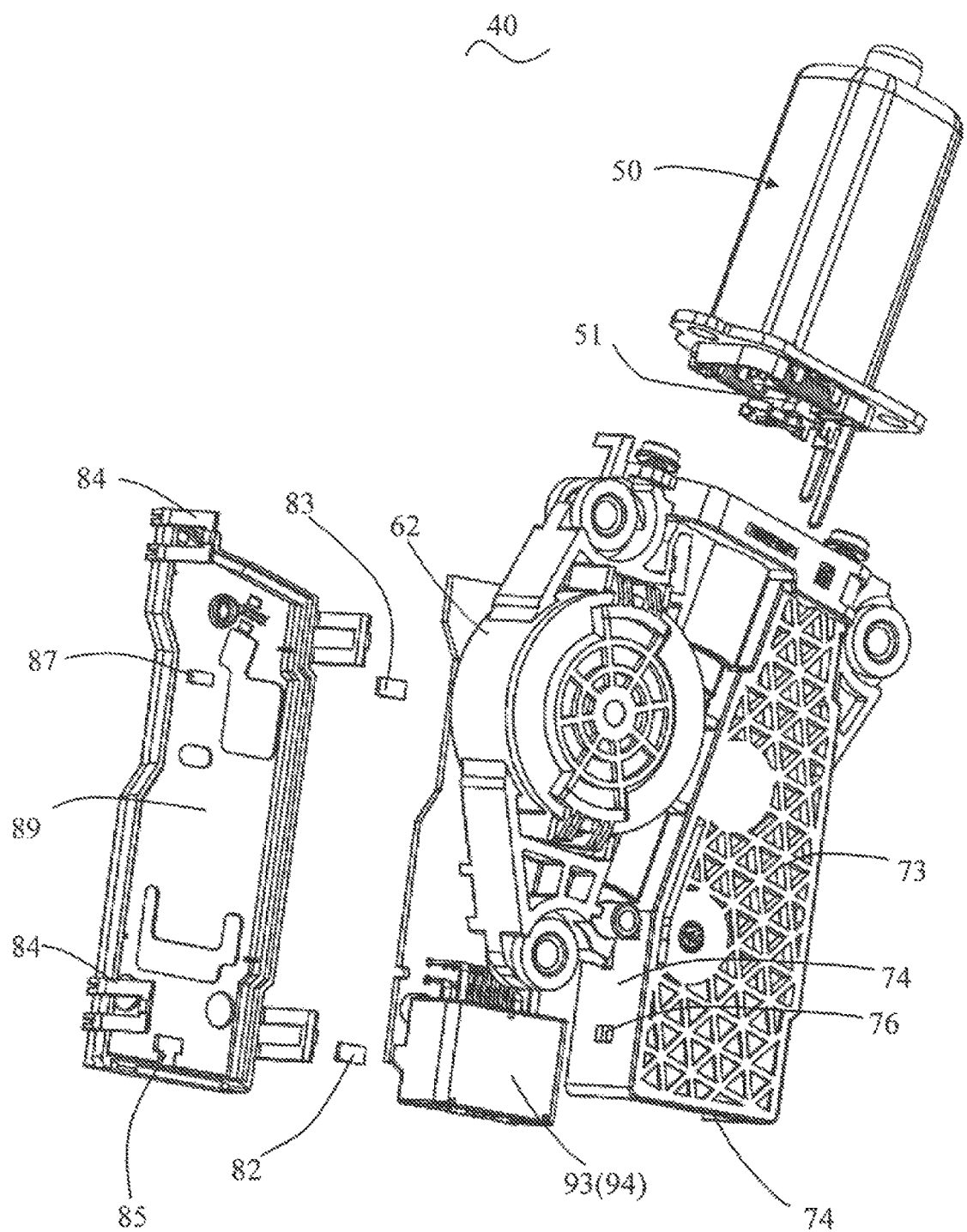
FIG. 3 is an exploded view of the actuator of FIG. 1, viewed from another angle.

Referring to FIG. 1 to FIG. 3, a driving apparatus or actuator 40 in accordance with one embodiment of the present invention includes a motor 50, a gearbox 60, and a motor control module 70.

The motor 50 used in this embodiment is a permanent magnet, direct current motor having a motor shaft 51 for torque output. Specifically, the motor 50 includes a stator and a rotor. The stator includes an outer housing, permanent magnets mounted to an inner surface of the outer housing, and an end cap and brush assembly mounted to an end of the outer housing. The rotor includes a rotor core and a commutator mounted to the shaft 51, and rotor windings wound around the rotor core and electrically connected with segments of the commutator. Power is supplied to the rotor windings via brushes of the brush assembly and the commutator.

Figure 9:
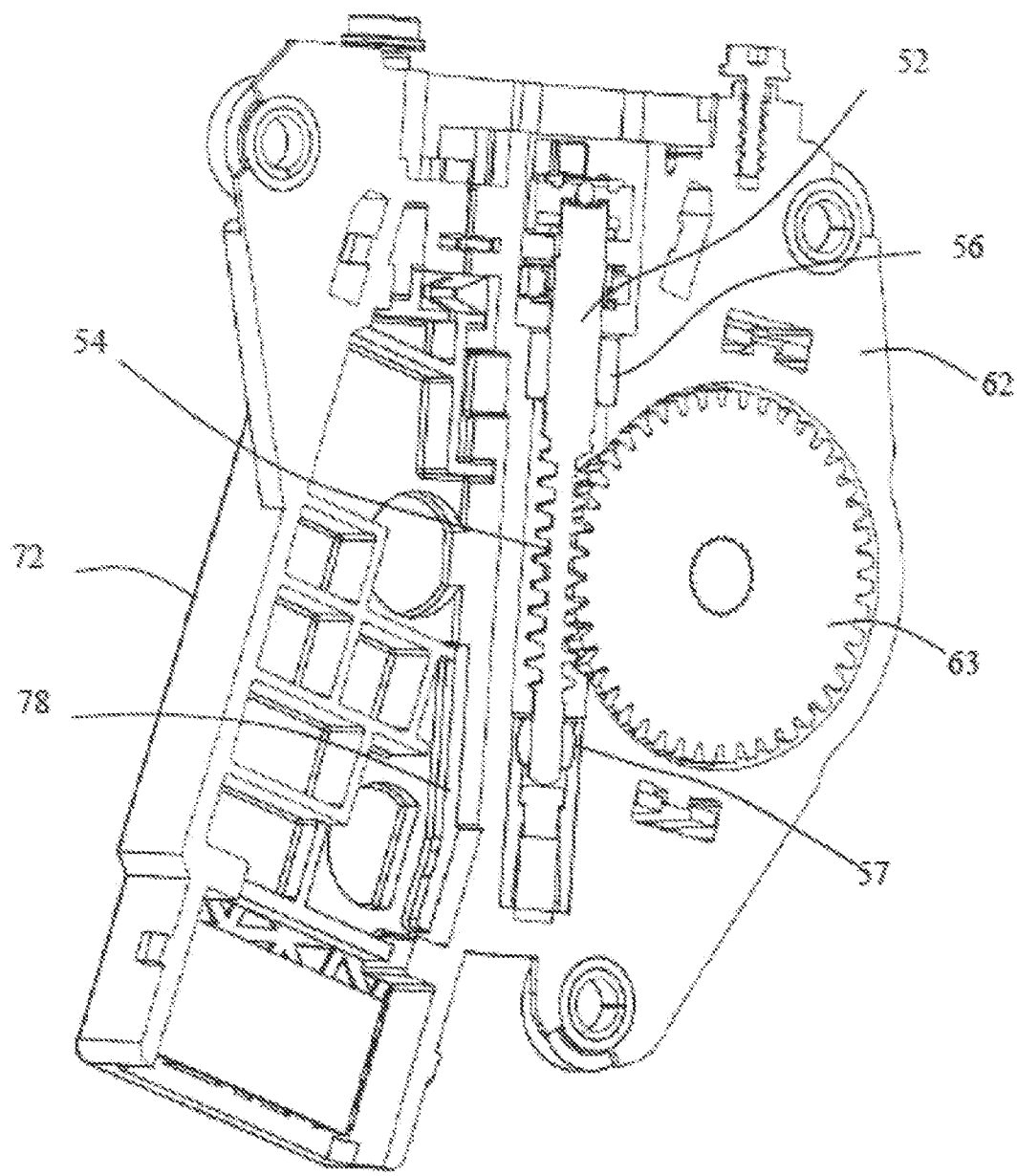
FIG. 9 is a sectional view of the parts of FIG. 8.

The shaft 51 of the motor is connected to a worm 52 (see FIG. 9). As the motor 50 turns, the worm 52 rotates. In the illustrated embodiment, the worm 52 and the shaft 51 of the motor 50 are separately manufactured and then connected together via a coupling. In an alternative embodiment, the worm may be in the form of a worm sleeve which is fixedly attached to the shaft. In another embodiment, teeth of the worm may be formed directly on the shaft, for example, by roll forming, turning or cutting.

The gearbox 60 includes a gearbox housing 62, a worm wheel 63 (FIG. 9) mounted within the gearbox housing 62 for meshing with the worm 52, and an output gear 64 coaxially fixed to and rotatable with the worm wheel 63. Specifically, the gearbox housing 62 forms a worm chamber for receiving the worm 52, and a worm wheel chamber for receiving the worm wheel 63. The worm chamber has an opening facing the motor 50, for allowing the motor shaft 51 to extend into the gearbox 60.

The control module 70 includes a control module housing, a printed circuit board 91 disposed in the housing, and a connector 93 connected with the printed circuit board 91. In the illustrated embodiment, the control module housing includes a lower housing 72 and an upper housing 81. The lower housing 72 and the upper housing 81 cooperatively define a control module chamber for receiving the printed circuit board 91. The connector 93 is installed at an open end of the control module chamber. The open end of the control module chamber is oriented in a direction away from the opening of the worm chamber. In the illustrated embodiment, the lower housing 72 of the control module 70 is integrally formed with the gearbox housing 62 (or a major portion of the gearbox housing 62), and the chamber of the control module 70 and the worm wheel chamber of the gearbox housing 62 are located on opposite sides of the worm chamber.

Specifically, the lower housing 72 includes a bottom plate 73, and two side plates 74 respectively connected to opposite edges of the bottom plate 73. The bottom plate 73 is substantially parallel to the printed circuit board 91. Multiple latch protrusions 76 are formed on outer surfaces of the two side plates 74. The upper housing 81 includes a cover plate 88 and multiple resilient latch tabs 84, each resilient latch tab 84 having a latch hole 86. When assembling the upper housing 81 to the lower housing 72, the resilient latch tabs 84 slide over the latch protrusions 74 along guide surfaces of the latch protrusions 74, until the latch protrusions 74 are engaged in the latch holes 86 of the resilient latch tabs 84 to secure the upper housing 81 to the lower housing 72.

The connector 93 is disposed on a surface of the printed circuit board 91 facing the bottom plate 73. The bottom plate 73 includes a plane surface 79 corresponding to the connector 93, for steadily supporting the connector 93, such that the connector 93 is securely positioned between the bottom plate 73 and the printed circuit board 91. In the illustrated embodiment, a first resilient vibration absorber 75 is disposed on the plane surface of the bottom plate 73, which protrudes above the plane surface 79. Preferably, the first resilient vibration absorber 75 is compressed between the connector 93 and the bottom plate 73. As vibration of the motor 50 is transmitted to the gearbox housing 62 and then to the lower housing 72 of the control module that is connected to the gearbox housing 62, the bottom plate 73 of the lower housing 72 can easily generate vibration and noise because of the plane surface 79. The first resilient vibration absorber 75 is disposed on the plane surface 79 of the bottom plate 73, is compressed by the connector 93 and can absorb vibration transmitted from the bottom plate to reduce the noise.

In the illustrated embodiment, the connector 93 includes an insulating connector body, multiple terminals disposed in the connector body and connected to the printed circuit board 91, a connector housing 94 disposed surrounding the connector body. The connector housing 94 is rectangular in shape.

The cover plate 88 of the upper housing 81 is also substantially parallel to the printed circuit board 91. An inner surface 89 of the cover plate 88, i.e. the surface facing the printed circuit board 91, is substantially flat. The inner surface 89 of the cover plate 88 is also provided with resilient vibration absorbers, i.e. a second resilient vibration absorber 82 and a third resilient vibration absorber 83 that contact the printed circuit board 91. Because the inner surface 89 of the cover plate 88 is substantially flat, the inner surface 89 can easily generate vibration and noise during operation of the actuator 40. The second resilient vibration absorber 82 and third resilient vibration absorber 83 that contact the printed circuit board 91 can absorb the vibration of the cover plate 88, thus reducing the noise.

Figure 4:
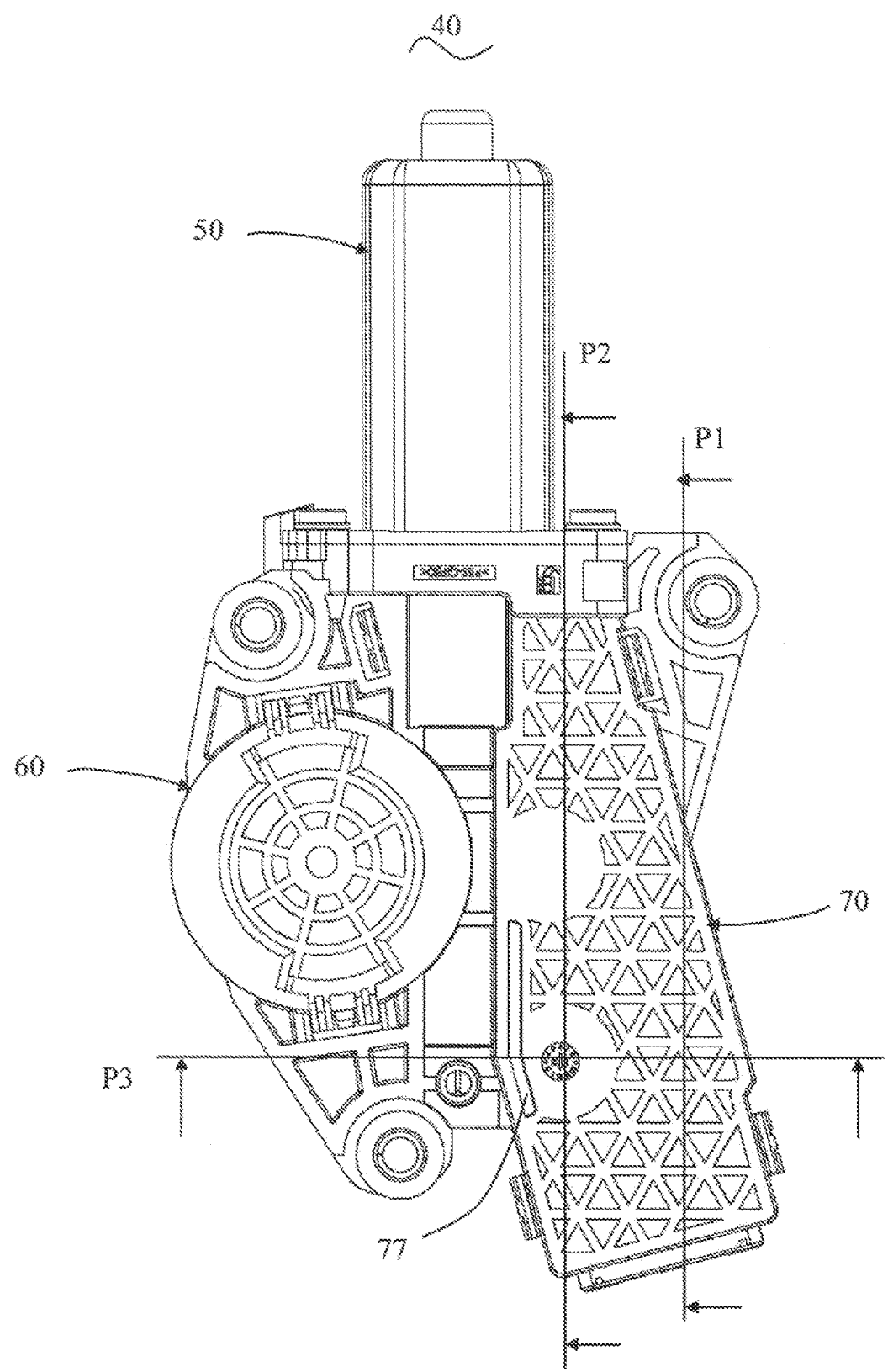
FIG. 4 is a plan view of the actuator of FIG. 1.
Figure 5:
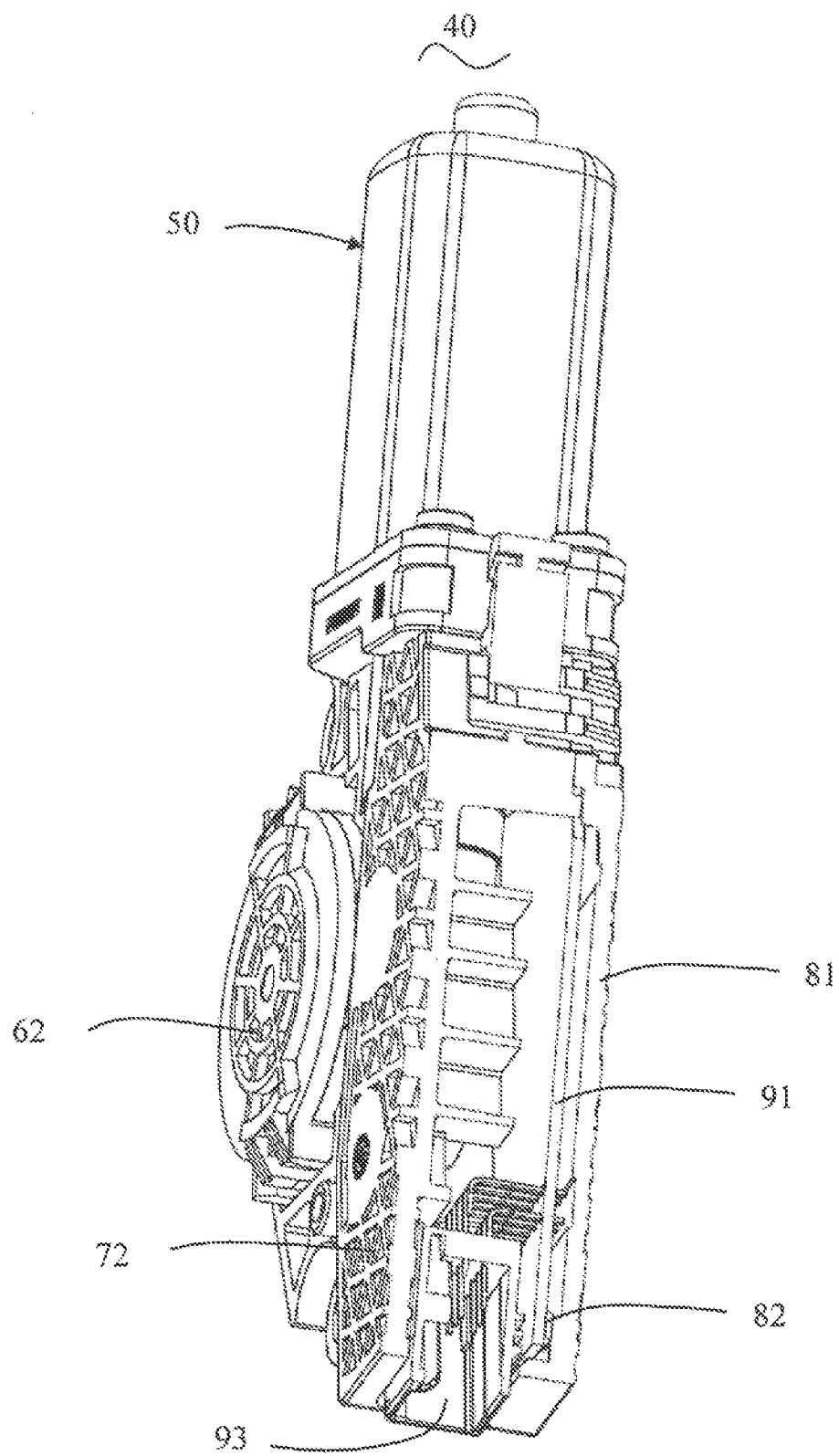
FIG. 5 is a sectional view of the actuator of FIG. 4, taken along the cutting plane P1.
Figure 6:
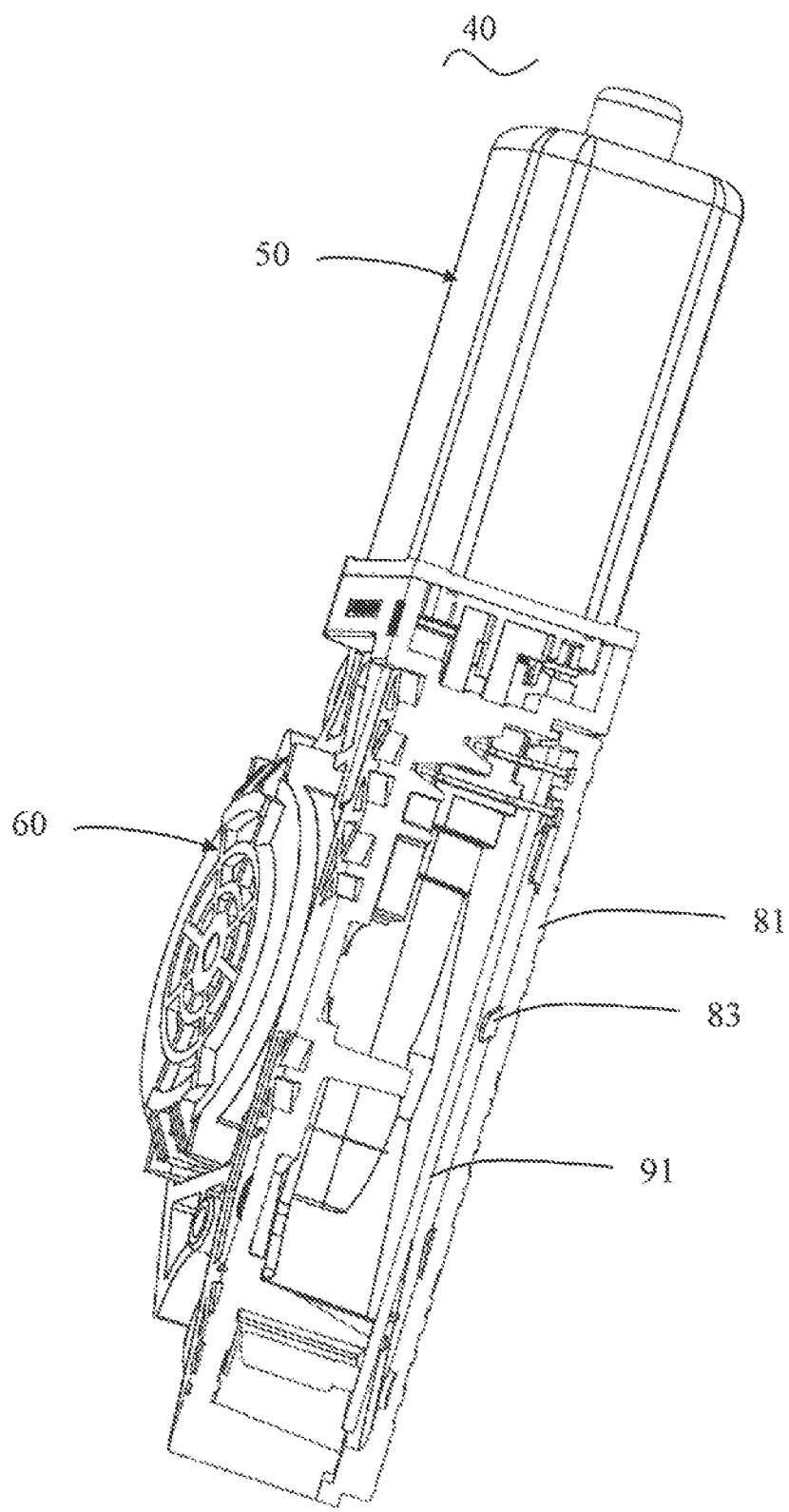
FIG. 6 is a sectional view of the actuator of FIG. 4, taken along the cutting plane P2.

Referring to FIG. 4 through FIG. 6, the second resilient vibration absorber 82 is compressed between the cover plate 88 and printed circuit board 91 in the region of the connector 93, and the third resilient vibration absorber 83 is compressed between the cover plate 88 and the printed circuit board 91.

Preferably, the inner surface 89 of the cover body 88 is provided with protruding blocks 85, 87 corresponding to the second resilient vibration absorber 82 and third resilient vibration absorber 83, respectively. The second resilient vibration absorber 82 and the third resilient vibration absorber 83 are attached to end surfaces of the protruding blocks 85, 87, such that the second resilient vibration absorber 82 and the third resilient vibration absorber 83 can successfully contact the printed circuit board 91.

Preferably, the first resilient vibration absorber 75, the second resilient vibration absorber 82 and the third resilient vibration absorber 83 are made of a suitable vibration absorbing material, such as, but not limited to, rubber and rubber like compounds. The number and shape of the resilient vibration absorbers of the bottom plate 73 and of the upper housing 81 is not intended to be limited to the particular number and shape described herein.

Figure 7:
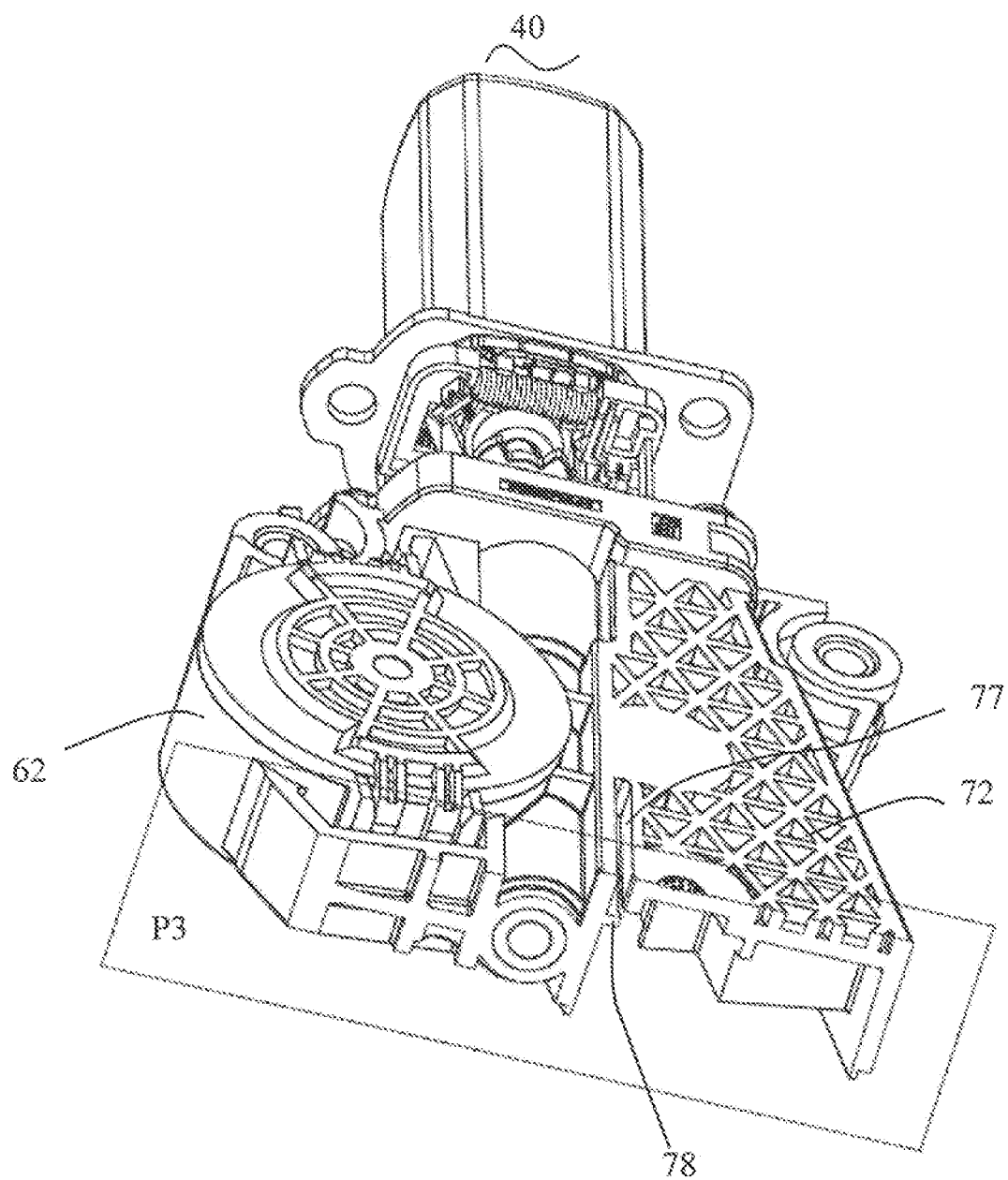
FIG. 7 is a sectional view of the actuator of FIG. 4, taken along the cutting plane P3, with an upper housing of a control module housing removed.

Referring to FIG. 4 and FIG. 7, the control module chamber and the worm wheel chamber are located at opposite sides of the worm chamber. An isolation slot 77 is formed between the control module chamber and the worm wheel chamber for isolating part of the connection between the worm wheel chamber and the control module chamber, thus weakening the vibration transmitted from the worm wheel chamber to the control module chamber. Specifically, the isolation slot 77 is formed through the bottom plate 73 of the lower housing 72 of the control module. The isolation slot 77 is located adjacent the worm chamber to break part of the vibration transmission path from the worm chamber to the control module chamber, thus reducing the impact of the worm chamber vibration to the bottom plate 73. Preferably, the side plate 74 close to the isolation slot 77 includes a shield portion 78 (FIG. 7) extending into the control module chamber. The shield portion 78 is aligned with the isolation slot 77 in the direction of the upper housing 81 and is connected to the lower housing 72, for blocking foreign matters from entering the control module chamber and fouling the printed circuit board 91 which may cause malfunction of the actuator. Preferably, the shape and size of the shield portion 78 matches with the isolation slot 77. In the illustrated embodiment, the shield portion 78 is dispose in parallel with the bottom plate 73.

Figure 8:
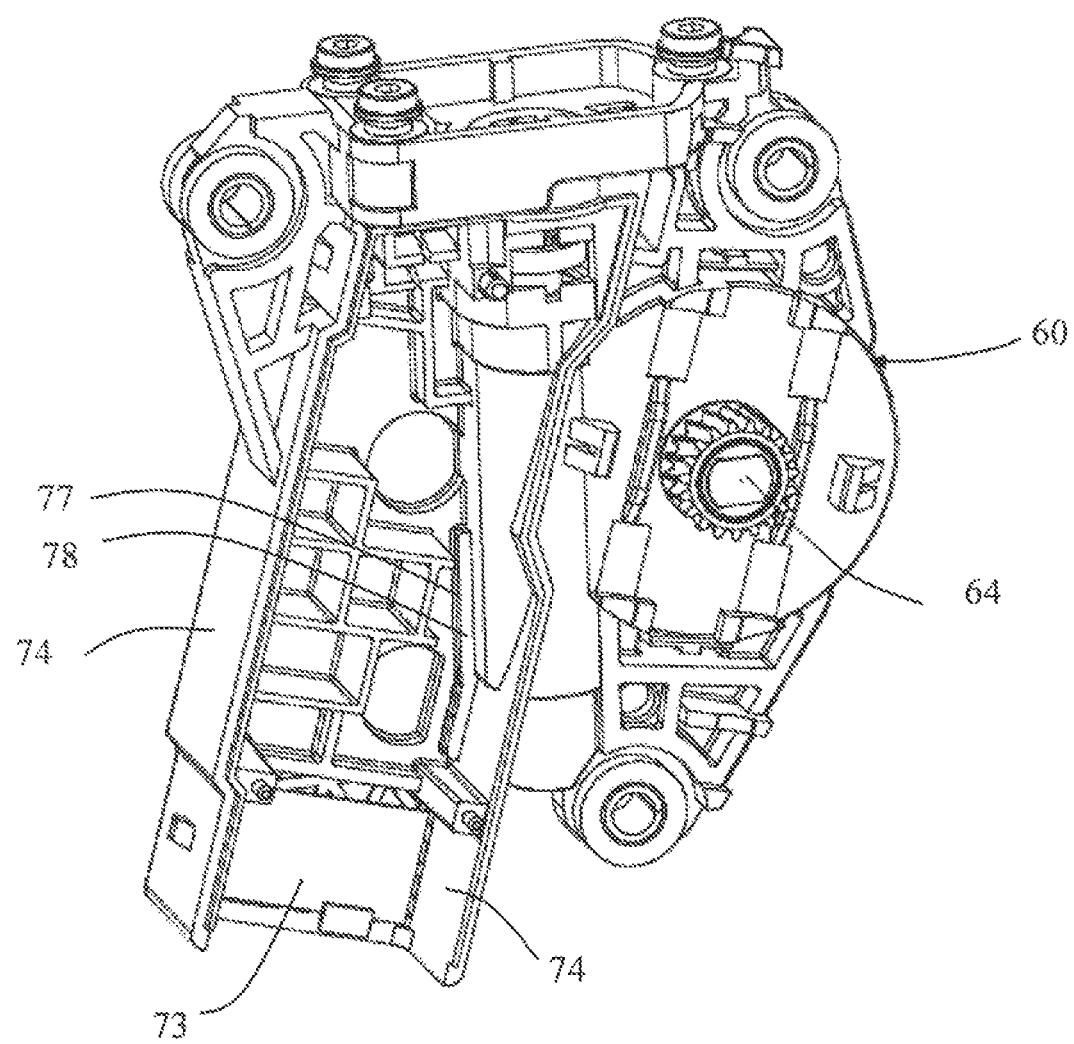
FIG. 8 illustrates the actuator of FIG. 7, with the motor and control module removed.

Referring to FIG. 7 through FIG. 9, the worm 52 includes a worm shaft and a meshing portion 54 formed on the worm shaft. The meshing portion 54 is meshed with the worm wheel 63. The worm shaft is supported by two bearings 56, 57 at opposite ends of the meshing portion. In the illustrated embodiment, the bearing 56 close to the motor end is a straight sliding bearing (also known as a sleeve bushing), and the bearing 57 away from the motor end is a spherical sliding bearing (also known as a self-aligning bushing). Preferably, the isolation slot 77 is located adjacent the bearing 57 to minimize the transmission of the meshing vibration of the worm wheel 63 and worm 52 to the control module via the bearing 57, thus reducing the vibration and noise.

The isolation slot 77 is greater than the bearing 57 in length along an axial direction of the worm to achieve better vibration and noise reduction results. Preferably, the length of the isolation slot 77 is two to five times of the length of the bearing 57 measured in the axial direction of the worm.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An actuator comprising:
a motor for driving a worm;
a gearbox comprising a gearbox housing, a gear train driven by the motor, and an output mechanism driven by the gear train; and
a motor control module comprising a control module housing, a printed circuit board received in the control module housing, and a connector connected to the printed circuit board and mounted at an open end of the control module housing, the control module housing connected with the gearbox housing;
wherein the control module housing comprises at least one plane surface with a resilient vibration absorber mounted thereon, and the resilient vibration absorber protrudes above the plane surface; and
wherein the control module housing comprises a lower housing and an upper housing, the lower housing comprises a bottom plate and two side plates respectively connected to two opposite edges of the bottom plate, the bottom plate is substantially parallel to the printed circuit board, the at least one plane surface comprises a surface of the bottom plate facing the printed circuit board, the resilient vibration absorber mounted on the surface of the bottom plate facing the printed circuit board is a first resilient vibration absorber.

2. The actuator of claim 1, wherein the first resilient vibration absorber is compressed between the connector and the bottom plate.

3. The actuator of claim 1, wherein the connector comprises a rectangular outer housing, and the first resilient vibration absorber is plate-shaped and compressed between the bottom plate and the rectangular outer housing.

4. The actuator of claim 1, wherein the control module housing comprises a lower housing and an upper housing, the upper housing comprises a cover plate, the at least one plane surface comprises a surface of the cover plate facing the printed circuit board, and the resilient vibration absorber mounted on the surface of the cover plate facing the printed circuit board is a second resilient vibration absorber.

5. The actuator of claim 4, wherein the second resilient vibration absorber is located between the connector and the cover plate.

6. The actuator of claim 4, wherein the surface of the cover plate facing the printed circuit board is further provided with a third resilient vibration absorber, and the third resilient vibration absorber is disposed between the cover plate and the printed circuit board.

7. The actuator of claim 1, wherein the gear train comprises: a worm driven by the motor, a worm wheel mounted in the gearbox and meshed with the worm, and the output mechanism is coaxially fixed to and rotatable with the worm wheel.

8. The actuator of claim 7, wherein at least a portion of the control module housing is integrally formed with at least a portion of the gearbox housing.

9. The actuator of claim 8, wherein the gearbox housing defines a worm chamber receiving the worm and a worm wheel chamber receiving the worm wheel, the control module housing defines a control module chamber receiving the printed circuit board, and the control module chamber and the worm chamber are located at opposite sides of the worm.

10. The actuator of claim 1, wherein the resilient vibration absorber is a rubber member.

* * * * *